United States Patent [19]

Barrett et al.

[11] Patent Number: 5,222,137

[45] Date of Patent: Jun. 22, 1993

[54] DYNAMIC ENCRYPTION KEY SELECTION FOR ENCRYPTED RADIO TRANSMISSIONS

[75] Inventors: Steven T. Barrett, Plantation, Fla.; Kevin M. Laird, Haltom City, Tex.; Richard E. Murray, Coral Springs, Fla.; James M. O'Connor, N. Richland Hills, Tex.

[73] Assignee: Motorola, Inc., Schaumburg, Ill.

[21] Appl. No.: 680,188

[22] Filed: Apr. 3, 1991

[51] Int. Cl.⁵ .............................. H04L 9/02
[52] U.S. Cl. ....................... 380/21; 380/43; 380/44; 380/49
[58] Field of Search ............ 380/21, 43, 46, 44, 380/49

[56] References Cited

U.S. PATENT DOCUMENTS

| | | | |
|---|---|---|---|
| 4,607,137 | 8/1986 | Jansen et al. | 380/21 X |
| 4,809,327 | 2/1989 | Shima | 380/21 X |
| 4,853,962 | 8/1989 | Brockman | 380/21 X |
| 4,876,716 | 10/1989 | Okamoto | 380/21 |
| 4,924,513 | 5/1990 | Herbison et al. | 380/21 |
| 5,146,498 | 9/1992 | Smith | 380/21 |

*Primary Examiner*—Tod Swann
*Attorney, Agent, or Firm*—Daniel K. Nichols; Pedro P. Hernandez

[57] ABSTRACT

A radio (100) transmits and receives encrypted signals having unencrypted key identifiers, allowing other radios having the corresponding key identifiers and encryption keys to communicate with radio (100). Prior to transmitting an encrypted message, radio (100) selects a unique key identifier automatically and uses the corresponding encryption key to encrypt the message that will be transmitted. Radio (100) transmits the key identifier in an unencrypted format with the encrypted message in order to allow other radios to determine the encryption key used in encrypting the message. When receiving an encrypted message, radio (100) uses the predetermined process stored in the radio (100) to properly select the proper encryption key for use in decrypting the incoming message.

5 Claims, 3 Drawing Sheets

DYNAMIC ENCRYPTION KEY SELECTION FOR ENCRYPTED RADIO TRANSMISSIONS

TECHNICAL FIELD

This invention relates generally to communication devices, and more specifically to radio frequency communication devices utilizing encryption.

BACKGROUND

As the need for protecting sensitive information which is transmitted over radio communication systems increases, better ways of protecting radio signals from eavesdroppers, becomes more of a concern for individual radio users. In communication devices where protection of voice/data messages is important, a system like the Motorola Digital Voice Protection System can be added to individual radios. The Digital Voice Protection System is an encryption system that converts an analog communication signal into a digital bit stream and then scrambles (encrypts) the digital bit stream with a technique to which only the sender and authorized receivers are given "keys" which allow the signals to be decrypted. If an eavesdropper tries to listen to the conversations on this type of system, the encrypted messages will be able to be received by the eavesdropper, but the messages will sound like pseudorandom noise unless the eavesdropper has the proper key to decrypt the message.

Security concerns in recent years have pushed the state of the art in radio communications to the point that today some communication devices now have multiple key and/or multiple encryption algorithm capabilities (e.g., DES-XL TM and DVP-XL TM, both trademarks of Motorola, Inc.). These communication devices transmit an unencrypted key ID field prior to transmitting the encrypted message in order to inform any receiving radios as to the encryption selected for the particular transmission. The receiving radios then automatically select the encryption to use in order to decrypt the incoming messages and can also by having transmit hangtime capabilities transmit back to the originating radio with the newly selected encryption.

The above mentioned radios unfortunately only give radios the capability of using multiple encryptions. When a radio user wants to originate a new transmission using a new encryption from those found in his radio, he has to manually select the new encryption. A need exists for a radio which can dynamically change the encryption used in encrypting a message sent by the radio on a transmission per transmission basis, thereby offering an even higher standard of security for radio users. A need also exists for a receiver which can predetermine the encryption that will be used by radios in transmitting future transmissions.

SUMMARY OF THE INVENTION

The radio includes a storage means for storing a plurality of encryption keys each having an assigned corresponding unique key identifier and a selection means for automatically selecting one of the key identifiers prior to the transmission of a message by the radio's transmitter. The radio also includes an encryption means for encrypting the message to be transmitted using the encryption key corresponding to the key identifier automatically selected. The radio's receiver means receives encrypted messages having unencrypted key identifiers appended, and a second selection means automatically selects from among the plurality of stored key identifiers the key identifier which is to be used to properly decrypt the received encrypted message.

In another aspect of the present invention a receiver capable of receiving encrypted messages having unencrypted key identifiers is disclosed. The receiver includes a storage means for storing a plurality of encryption keys each having a corresponding unique key identifier, and a selection means for automatically selecting from among the plurality of encryption keys the encryption key which is to be used to properly decrypt the received message. The receiver also includes a decryption means for decrypting the encrypted message using the encryption key selected by the decoding means.

DETAILED DESCRIPTION OF THE PREFERRED EMBODIMENT

Figure 1:
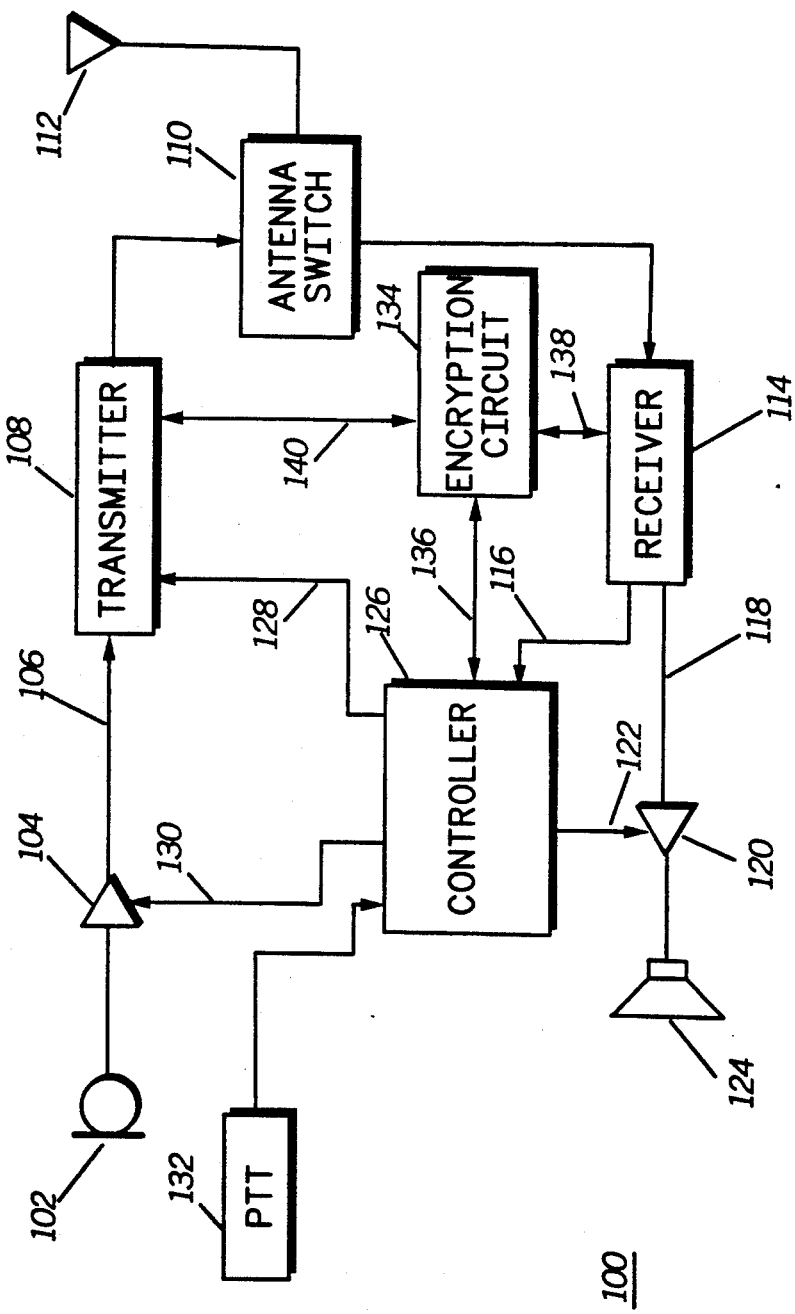
FIG. 1 shows a block diagram of a radio in accordance with the present invention.

Referring now by characters of reference to the drawings and first to FIG. 1, a block diagram of a radio 100 such as a portable radio capable of operating in an encrypted mode is shown. Radio 100 includes a receiver means, such as receiver 114, which is used for receiving information from other communication devices and systems. An antenna switch 110 selectively couples antenna 112 to either the receiver 114 or a transmitter 108 depending on the state of radio 100. Both receiver 114 and transmitter 108 are of conventional design as known in the art. When receiving a message, an incoming radio frequency signal is routed from antenna 112 to receiver 114 where the signal is decoded. The signal is then sent to controller 126 where the controller determines if the signal is encrypted. If the signal is encrypted, controller 126 sends the signal via bus 136 to encryption circuit 134 where the signal is decrypted and sent back via bus 136 to controller 126. Voice messages are routed back to receiver 114 where the signal is then sent via line 118 through audio amplifier 120 where the voice signal is amplified and presented to speaker 124. Controller 126 can control the volume of the output audio signal by adjusting the gain of amplifier 120 via line 122, which is normally controlled by the user via a volume switch (not shown).

Preferably, encryption circuit 134 includes a plurality of encryption keys and encryption algorithms which are stored in a storage means such as memory locations which are part of radio controller 126, the storage means can also be part of encryption circuit 134 if so designed. Radio 100 can choose between the different encryptions keys and algorithms in order to automatically switch the encryption which is utilized on a transmission by transmission basis. Encryption circuit 134 acts as the encryption means during radio transmissions and as the decryption means when radio 100 is receiving encrypted messages. Consequently, the encryption key can be used for both encryption and decryption.

Controller 126 is in charge of coordinating the overall activities of radio 100 including the control of both transmitter 108 and receiver 114. Controller 126 preferably comprises a conventional microprocessor or microcontroller, having on-chip memory, I/O lines, and the capability for external memory device interfacing. In the present invention, controller 126 also controls the dynamic changing of encryptions keys by informing encryption circuit 134 when to load in a new encryption key in order to decrypt an incoming message or encrypt a message which is to be transmitted. Radio 100 can be a conventional radio, trunked radio, or other type of radio as known in the communication art. Radio 100 can also be a conventional analog transmission radio (FM), or can be a radio capable of digitally transmitting information (i.e. linear modulated, etc.)

Figure 2:
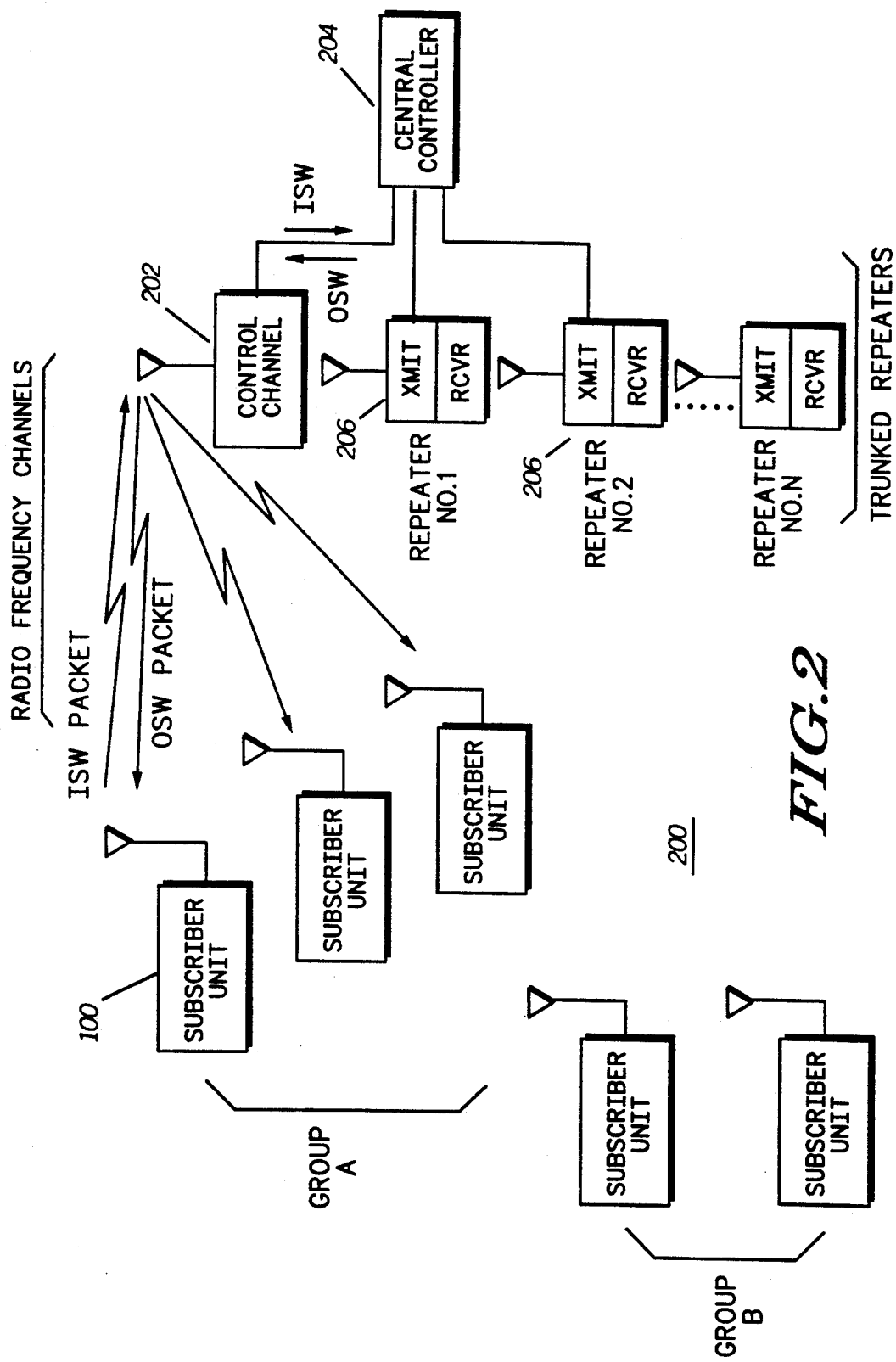
FIG. 2 is a block diagram of a typical communication system in accordance with the present invention.

If radio 100 is a trunked radio operating in a trunked radio communication system such as that shown in FIG. 2, controller 126 controls the switching of frequencies for both the transmitter 108 and receiver 114 depending on instructions which would come from the trunked system central controller 204 (shown in FIG. 2).

In order for radio 100 to transmit a voice message, PTT switch 132 is activated by the radio user, which in turn activates the transmitter means such as transmitter 108 via a signal coming from controller 126 on bus 128. During a normal voice transmission, the radio user speaks into microphone 102 which converts the audio signals to electrical signals which are in turn amplified by amplifier 104. Amplifier 104 has gain adjustment capability via line 130, which is controlled by controller 126. The amplified signal is then fed to transmitter 108 which converts the signal to a radio frequency signal and transmits the signal via antenna switch 110 to antenna 112. If the transmission is required to be encrypted, the signal is routed via bus 140 to the encryption circuit 134 prior to its transmission, where it is there encrypted and sent back to transmitter 108 for transmission.

In FIG. 2 a block diagram of a typical communication system which can use the present invention such as a trunked radio communication system is shown. The radios or subscriber units 100, which are part of system 200, communicate over a control channel 202 with the control resource such as system central controller 204 in order to receive status and control information from the central controller 204. In communication systems which are not trunked, the control resource can be a base station or other similar communication devices, or in a system having only radios the control resource can be the embedded signalling sent by the individual radios themselves. The system central controller 204 acts as the system coordinator and is responsible for assigning radios in the same groups to different repeaters 206 (voice channels) so that they may communicate amongst each other whenever a request from one of the groups comes into the controller. The central controller 204 is also responsible for knowing where each of the radios are located (i.e. what voice channel) and for controlling other features typically found in a modern trunked communication system (e.g. handling phone patches, coordinating groups of radios in emergency situations, etc). The typical central controller 204 includes a main processing unit such as a computer with appropriate control software which controls the operation of controller 204. Also normally included as part of controller 204 is a video display and keyboard in order to allow the central control operator to communicate with the system.

The signals which are sent from the central controller 204 to the subscriber units over the control channel 202 are typically called outbound signalling words ("OSW's"). The control signals going from radios 100 to the central controller 204 are called inbound signalling words (ISW's). OSW's for example, inform particular radios 100 as to when to change channels automatically, so as to allow them to communicate with other members of the same radio group over an assigned voice channel 206.

An example of a typical trunked conversation will begin by one radio 100 in group "A" pressing PTT which automatically sends an ISW over the control channel 202 to the central controller 204 requesting a voice channel grant (allocation of one of the voice channels 206). Once the request comes in, central controller 204 decides which voice channel 206 to assign and transmits an OSW via control channel 202 back to radios 100. The OSW will inform all radios 100 in group "A" to move to repeater No. 2 for example, at which point all the radios in group "A" will move to that repeater to begin their conversation. Although FIG. 2 shows a trunked communication system, the present invention can operate in many types of communication system including but not limited to cellular systems, conventional radio systems, and system using embedded signalling on the RF channel.

Figure 3A:
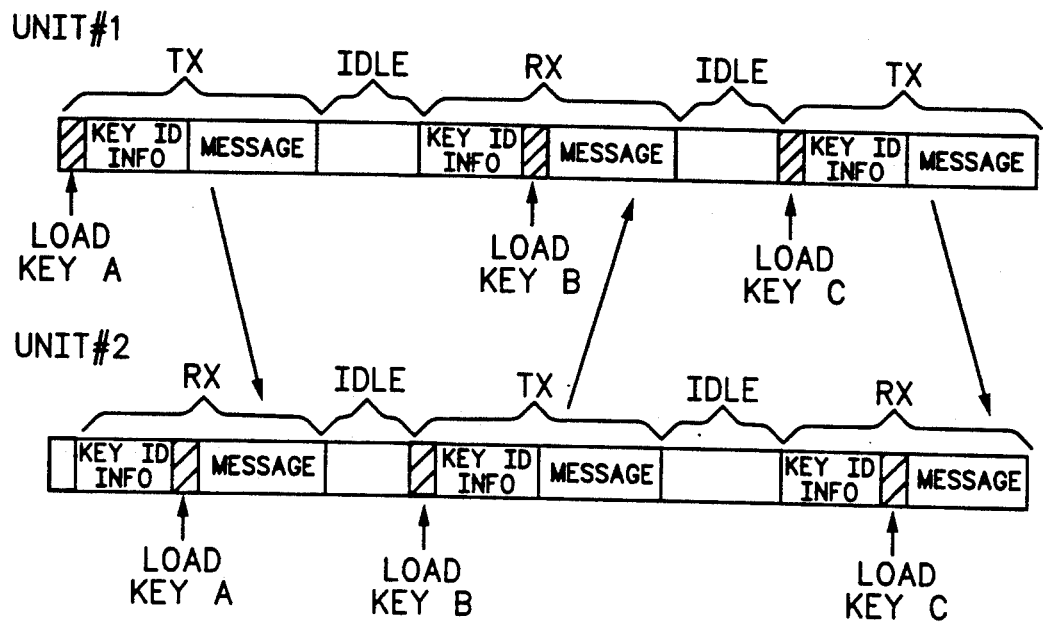
FIG. 3A shows a way of dynamically changing the radio encryption key during the course of a radio conversation in accordance with the present invention.

In FIG. 3A there is shown a way of automatically changing the radio's encryption during the course of a radio conversation in accordance with the present invention. FIG. 3A shows a typical encrypted conversation as disclosed in the present invention. Each time a radio 100, either unit #1 or #2 sends a transmission, a new encryption (new key and/or algorithm), which will be hereinafter referred to simply as "encryption key", will be used to encrypt the next message to be transmitted. Each time a radio sends a transmission, a different encryption key identifier can be randomly selected from among a group of key identifiers representing the encryption keys stored in the radio's encryption circuitry 134. The key identifier is simply a number or other designation assigned to an encryption key and is in no other way related to the encryption key itself. The encryption key associated with the chosen key identifier is then used to encrypt the message to be transmitted, which is done by the encryption circuit 134. Preferably, the plurality of unique key identifiers and encryption keys can be stored in a storage means which can be in radio controller 126. The data relating to the chosen encryption key can then be sent over bus 136 to encryption circuit 134. Another alternative is to have the list of key identifiers stored in controller 126 and the encryption keys stored in encryption circuit 134.

Controller 126, which acts as the radio's control means has a first selection means such as a conventional random number generation algorithm stored in the controller's memory which is executed by controller 126 in order to randomly determine the next key identifier to select for use by the encryption circuit 134 in encrypting the message to be transmitted. Once a key identifier is automatically selected, controller 126 sends the corresponding encryption information data (e.g. new encryption key data) via bus 136 to encryption circuit 134 so that the encryption information can be loaded in encryption circuit 134.

Controller 126 upon selecting a key identifier sends a message over bus 136 to encryption circuit 134 informing the encryption circuit 134 of what key ID has been selected. The key identifier basically acts as a pointer allowing encryption circuit 134 to choose the correct encryption key from among the plurality of encryption keys stored in encryption circuit 134 or if the encryption keys are stored in controller 126 the data (i.e. encryption information) is sent via bus 136 and loaded into encryption circuit 134. Preferably, encryption circuit 134 comprises one encryption algorithm in the form of an encryption hybrid, for example DES-XL, which is loaded with the encryption key that matches the key identifier selected. The selected key is loaded into the encryption hybrid from memory locations that are also part of the encryption circuit 134, allowing for the algorithm to become scrambled with that particular key pattern. A more sophisticated embodiment of the present invention can have encryption circuit 134 support a plurality of encryption hybrids, for example, DES-XL and DVP-XL. In this particular case, the key identifier selected by the controller 126 informs encryption circuit 134 which encryption hybrid to select and then which key to load into the selected hybrid. In this particular case, the key identifier points to a particular encryption algorithm and key combination.

Radio 100 transmits the key identifier which is selected, in an unencrypted format prior to the encrypted message being transmitted. The radio units 100 receiving the encrypted transmission also have the same set of encryption keys and corresponding key identifiers stored. Upon receiving the unencrypted key identifier, the receiving radios 100 decode the unencrypted key identifier by using a decoder means such as a conventional decoding algorithm stored in controller 126 which decoded the unencrypted key identifier. Once the received key identifier is decoded, a second selection means included in controller 126 in the form of a comparison program, finds the corresponding key identifier stored in the radio. Once the correct key identifier is located, the corresponding encryption key is loaded into encryption circuit 134 in order to decrypt the encrypted message which accompanied the decoded key identifier. Each radio 100 in communication system 200 has a list of identical encryption keys each having the corresponding unique key identifier, thereby allowing radios 100 to transmit and receive to each other using different encryption keys on a transmission per transmission basis.

When unit #1 has its PTT switch activated, the radio automatically selects a key identifier from the available list of key identifier's stored in encryption circuit 134, this can be done using a conventional random generation program stored in controller 126 or a predetermined selection process (selection program) also stored in controller 126. The automatically selected key identifier information can then be sent over bus 136. The encryption (traffic key), which is related to the selected key identifier is then selected in order to encrypt the radio transmission which follows. This is done by loading the appropriate encryption device (i.e. DES-XL) which is part of encryption circuit 134 with the selected key. As soon as encryption circuit 134 has decided which encryption key to use for encrypting the message, the key identifier information is relayed to transmitter 108 which transmits this information prior to the radio user's message going out over the air. Radio unit #2 receives the key identifier transmitted by radio unit #1 and then uses the unencrypted key identifier to load the appropriate encryption key into its encryption circuitry in order to decode the encrypted message which follows.

FIG. 3A then shows radio #2 loading encryption key "B", transmitting the key id information to unit #1, followed by an encrypted message encrypted with encryption key "B". Radio unit #1 then receives the key identifier information and loads the appropriate encryption key in order to decrypt the message. This routine is followed by each radio prior to each radio transmitting a message. Changing the encryption key that is used to transmit a message every time a message is transmitted adds a higher level of security to the radio transmissions, by forcing any would be eavesdropper not only to be able to decipher not one encryption key but many in order to intercept ongoing radio transmissions. By automatically selecting the key identifier to use on a transmission per transmission basis the radio user does not have to preoccupy himself with manually changing encryptions.

Figure 3B:
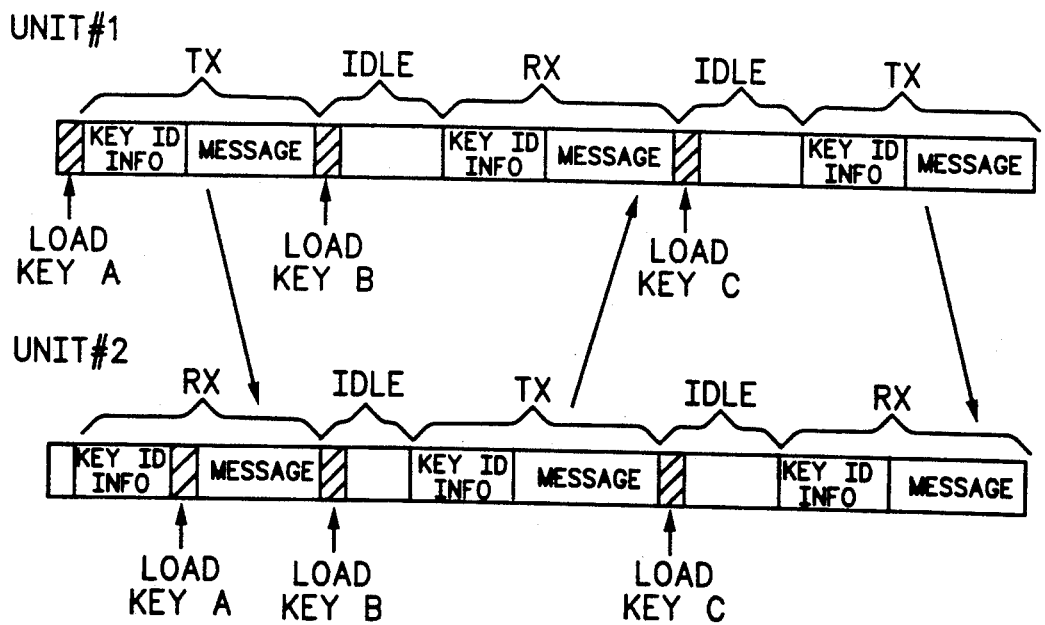
FIG. 3B shows a second way of dynamically changing the radio encryption key during the course of a radio conversation in accordance with the present invention.

In FIG. 3B a similar transmission sequence as in FIG. 3A is shown except this communication sequence has been modified to reduce the delays caused in FIG. 3A by the radios having to decode the key identifier information each time the radios began receiving information. The delays in FIG. 3A are caused because it is assumed that radios 100 randomly select a key identifier prior to any radio transmissions. This causes the radios that are receiving the message to first decode the key identifier in order to load in the proper encryption key to decrypt the incoming message. In FIG. 3B the radios, instead of using a random encryption key generation protocol, use a predetermined encryption key selection program which is stored in each radios controller 126. By having each radio in a system use the same encryption selection algorithm (both receiving and transmitting radios), normally only the first transmission sequence will require any delay in decoding the key identifier information. After the first cycle all of the radios know the encryption key which will be used to encrypt the following message, thereby allowing the radios to load in the new encryption key information prior to any radio transmitting or receiving any information. The decoding of the key identifiers need only be done by radios which are not "in synch" with the predetermined selection process (i.e. do not know the next encryption which will be used). If the predetermined selection process chosen repeats a key identifier more than once prior to the algorithm cycling one time through, it will require receiving radios 100 who are just coming into the system to receive two or more key identifiers in order to properly determine the place in the predetermined sequence the radios in the system are presently at. This will cause a slight delay in radios just coming into the system in having to properly decode the key ID a few times until the new radio can begin using the predetermined algorithm automatically. The preprogrammed encryption key sequence can be as simple as an algorithm stored in controller 126 that uses the next key identifier in a key identifier list, or can be a more complex algorithm repeating the key identifiers in a complex manner.

As is shown in FIG. 3, radio unit #1 loads encryption key "A" and the radio then follows the standard routine of transmitting the unencrypted key identifier information followed by the encrypted message which is encrypted with the encryption corresponding to key identifier "A". Radio unit #2 receives the unencrypted key identifier which is decoded and then unit #2 compares the presently loaded encryption to see if the key identifier of the presently loaded encryption matches the decoded key identifier. If the key ID's do not match, the radio automatically loads the encryption associated with the decoded key identifier by running a comparison program with the list of encryption keys the radio has stored in controller 126. After the key identifier is loaded, the encrypted message that follows is decrypted. In this new method of selecting the key identifier as shown in FIG. 3B, both radios load key "B" after the first transmission call has dropped, since this is the next key which is to be loaded according to their predetermined identifier selection process which all radios in the system follow. Since both radios follow the same predetermined key identifier selection process, there is no delay associated with key identifier decoding and key loading as was the case in FIG. 3A, once the radios come in "synch" with the predetermined key identifier selection process.

Radios 100, which go out of range or have been turned off, can automatically synch with other radios in the group since the key identifier is sent prior to every transmission in an unencrypted format. The synch up procedure requires a key identifier to be decoded using the decoding means which is in controller 126, and then the proper key needs to be loaded, after which the radio 100 will be able to follow the predetermined key identifier selection process which all radios 100 are following. For example, radios 100 in system 200 could all be using key identifiers "A", "B", "C", and "D" each identifier pointing to a different encryption key and all the radios 100 using a predetermined process which follows the sequence of "D", "B", "A", and "C", in that particular order. A radio first coming into system 200 would only have to decode the first key identifier in order to determine the next key identifier (and encryption key) which will be used in the next transmission by any radio 100 in that particular radio group. A trunked radio system like that shown in FIG. 2 could have each of the radio groups utilizing a different unique predetermined selection process for all radio group voice traffic transmissions.

In summary, the present invention illustrates how to increase the overall security of radio communications by utilizing radios which can automatically change the encryption being used to encrypt transmissions on a transmission by transmission basis. By transmitting an unencrypted key identifier prior to the encrypted transmission all other radios which have the correct key identifier can decrypt the message. Since the key identifiers have no relationship to the encryption key being used except for their use in pointing to the location of the corresponding encryption key in the individual radios, an eavesdropper could no use for the key identifier if he were able to decode it. By using more than one encryption key to encrypt transmissions a higher level of security can be had for individual communications. If an eavesdropper were able to decipher one of the encryption keys he still would only be able to listen to a very short piece of a conversation, since most of the transmissions would be using a different encryption key to encrypt the transmissions. By also using a predetermined encryption selection process which is utilized by all radios in a system, all radios can automatically know what encryption will be used for the next transmission by any particular radio. By using the predetermined selection process, very little delays are encountered in automatically switching encryptions on a transmission per transmission basis. Which makes the overall communications more secure and does not add delays to the radio transmissions.

What is claimed is:

1. A method for transmitting encrypted messages between first and second radios, each of the radios including a plurality of encryption keys each having a unique key identifier, each of the first and second radios also each having an encryption key selection program, the method comprising the steps of:

at the first radio:
   selecting a key identifier from among the plurality of key identifiers;
   encrypting a message that is to be transmitted to the second radio using the encryption key which corresponds to the selected key identifier;
   appending the key identifier to the encrypted message;
   transmitting the encrypted message and key identifier to the second radio;
   selecting from among the plurality of encryption keys a new encryption key using the encryption selection program found in the first radio;

at the second radio;
   receiving the encrypted message from the first radio;
   decoding the key identifier sent with the encrypted message;
   decrypting the encrypted message using the encryption key which corresponds to the decoded key identifier; and
   selecting a new encryption key using the encryption selection program found in the second radio which matches the new encryption key selected by the first radio.

2. A method for transmitting encrypted messages as defined in claim 1, further comprising the steps of:

at the second radio:
   encrypting a message to be transmitted to the first radio using the new encryption key selected by the encryption selection program found in the second radio; and at the first radio:
   decrypting the encrypted message sent by the second radio using the new encryption key selected by the encryption selection program found in the first radio.

3. A method for transmitting encrypted messages as defined in claim 1, wherein the selected key identifier is transmitted in an unencrypted format with the encrypted message that is transmitted to the second radio.

4. A method for transmitting encrypted messages as defined in claim 1, wherein the key identifier selected by the first radio is randomly selected from among the plurality of encryption keys found in the first radio.

5. A method for transmitting encrypted messages as defined in claim 4; wherein the new encryption key selected using the encryption selection program found in the first radio is dependent on the randomly selected key identifier.

* * * * *